(12) United States Patent
Shore et al.

(10) Patent No.: US 7,086,783 B2
(45) Date of Patent: Aug. 8, 2006

(54) LAYING HEAD BEARING WITH OFFSET PRELOADING

(75) Inventors: T. Michael Shore, Princeton, MA (US); James F. Walsh, Shrewsbury, MA (US)

(73) Assignee: Morgan Construction Company, Worcester, MA (US)

(*) Notice: Subject to any disclaimer, the term of this patent is extended or adjusted under 35 U.S.C. 154(b) by 0 days.

(21) Appl. No.: 10/300,060

(22) Filed: Nov. 20, 2002

(65) Prior Publication Data

US 2003/0113050 A1 Jun. 19, 2003

Related U.S. Application Data

(63) Continuation-in-part of application No. 10/082,986, filed on Feb. 26, 2002.
(60) Provisional application No. 60/340,190, filed on Dec. 14, 2001.

(51) Int. Cl.
*F16C 23/00* (2006.01)

(52) U.S. Cl. ............... 384/519; 384/500; 384/583
(58) Field of Classification Search ............... 384/500, 384/504, 513, 519, 535, 541, 548, 569, 581, 384/583–585, 517, 563, 447
See application file for complete search history.

(56) References Cited

U.S. PATENT DOCUMENTS

| | | | |
|---|---|---|---|
| 1,162,125 A | * 11/1915 | Bassett | 384/535 |
| 1,427,818 A | * 9/1922 | Hutchinson | 384/512 |
| 1,625,812 A | 4/1927 | Leon et al. | |
| 1,643,156 A | * 9/1927 | Farmer | 384/519 |
| 3,558,199 A | 1/1971 | Raiser et al. | |
| 3,675,977 A | 7/1972 | Arsenius et al. | |
| 3,880,481 A | 4/1975 | George | |
| 3,984,159 A | 10/1976 | Jenness | |
| 4,172,621 A | 10/1979 | Yoshida | |
| 4,626,111 A | 12/1986 | Swasey et al. | |
| 4,765,556 A | * 8/1988 | Nasrah | 242/361 |
| 4,843,854 A | 7/1989 | Ackerly | |
| 4,854,750 A | * 8/1989 | Lavin | 384/500 |
| 4,926,493 A | 5/1990 | Junker | |
| 5,033,689 A | * 7/1991 | Poloni | 242/361 |
| 5,037,214 A | 8/1991 | Dougherty | |
| 5,114,247 A | 5/1992 | Folino | |
| 5,312,065 A | * 5/1994 | Shore et al. | 242/361 |
| 5,524,469 A | 6/1996 | Sherwood | |
| 5,558,594 A | 9/1996 | Lefranc et al. | |
| 5,752,404 A | 5/1998 | White et al. | |
| 6,033,122 A | 3/2000 | Kellstrom et al. | |
| 6,042,275 A | 3/2000 | Muntnich et al. | |
| 6,283,639 B1 | 9/2001 | Rode | |
| 2002/0014549 A1 | 2/2002 | Grimmel et al. | |

FOREIGN PATENT DOCUMENTS

| | | |
|---|---|---|
| CH | 358995 | 12/1961 |
| DE | 2538272 | 3/1977 |
| JP | 9019717 | 1/1997 |

* cited by examiner

*Primary Examiner*—Thomas R. Hannon
(74) *Attorney, Agent, or Firm*—Gauthier & Connors, LLP

(57) ABSTRACT

A bearing assembly is disclosed for rotatably supporting a quill in the housing of a rolling mill laying head. The bearing assembly includes first and second axially spaced roller bearing sets interposed between the quill and the housing. The bearing assembly also includes a force exerting unit for applying a radial preloading force to the first bearing set at a first location around the circumference thereof. The preloading force is opposed by a reactionary force acting on the second bearing set at a second location around the circumference thereof disposed 180° from the first location.

8 Claims, 4 Drawing Sheets

LAYING HEAD BEARING WITH OFFSET PRELOADING

CROSS REFERENCE TO RELATED APPLICATIONS

This application is a continuation-in-part of U.S. patent application Ser. No. 10/082,986 filed Feb. 26, 2002, which claims priority from U.S. Provisional Patent Application Ser. No. 60/340,190 filed Dec. 14, 2001.

BACKGROUND OF THE INVENTION

1. Field of the Invention

This invention relates to laying heads of the type employed in high speed rod mills to form the hot rolled exiting product into a helical formation of rings.

2. Description of the Prior Art

A conventional laying head is schematically depicted at 10 in FIG. 1. The laying head includes a housing 12 containing a hollow quill 14 rotatably supported between front and rear roller bearing assemblies 16 and 18. The quill 14 carries a bevel gear 20 meshing with a mating bevel gear 22, the latter being driven in a conventional manner by a gear box and motor (not shown).

A laying pipe 24 is carried by the quill 14. The laying pipe has an entry end 24a aligned with the rotational axis X of the quill, and a curved intermediate section 24b leading to an exit end 24c spaced radially from the axis X.

In a typical modern day high speed rolling operation, a finished rod with a 5.5 mm diameter exits the mill a speeds on the order of 112–120 m/sec and at a temperature in the range of 750 to 1100° C. The rod can either be delivered to the laying head at these elevated temperatures, or it can be water cooled down to about 600–950° C. before it enters the entry end 24a of the laying pipe. The curvature of the laying pipe, coupled with its rotation about axis X, forms the rod into a helical series of rings R. The rings are delivered to a cooling conveyor (not shown), on which they are distributed in an offset overlapping pattern for additional cooling prior to being gathered into coils.

When operating under these conditions, the laying head can attain rotational speeds on the order of 1500–2250 RPM and higher, and the rotating components of the laying head, including the roller bearing assemblies supporting the quill, can be exposed to temperatures a high as 100–110° C. The roller bearing assemblies must thus be designed with adequate clearances to accommodate thermal expansion and contraction.

It has now been determined that, particularly in the front bearing assembly 16, which is relatively lightly loaded, at certain speeds such clearances can cause detrimental roller skidding and vibration.

SUMMARY OF THE INVENTION

The objective of the present invention is to eliminate or at least significantly reduce roller skidding and vibration caused by clearances in the front bearing assembly.

To this end, the front bearing assembly is subdivided into first and second axially spaced roller bearing sets. A radial preloading force is applied to the first roller bearing set at a first location around the circumference thereof. The preloading force is opposed by a reactionary force acting on the second bearing set at a second location around its circumference disposed 180° from the first location.

These and other objectives and features of the present invention will now be described in greater detail with reference to the accompanying drawings, wherein:

DETAILED DESCRIPTION OF PREFERRED EMBODIMENT

Figure 1:
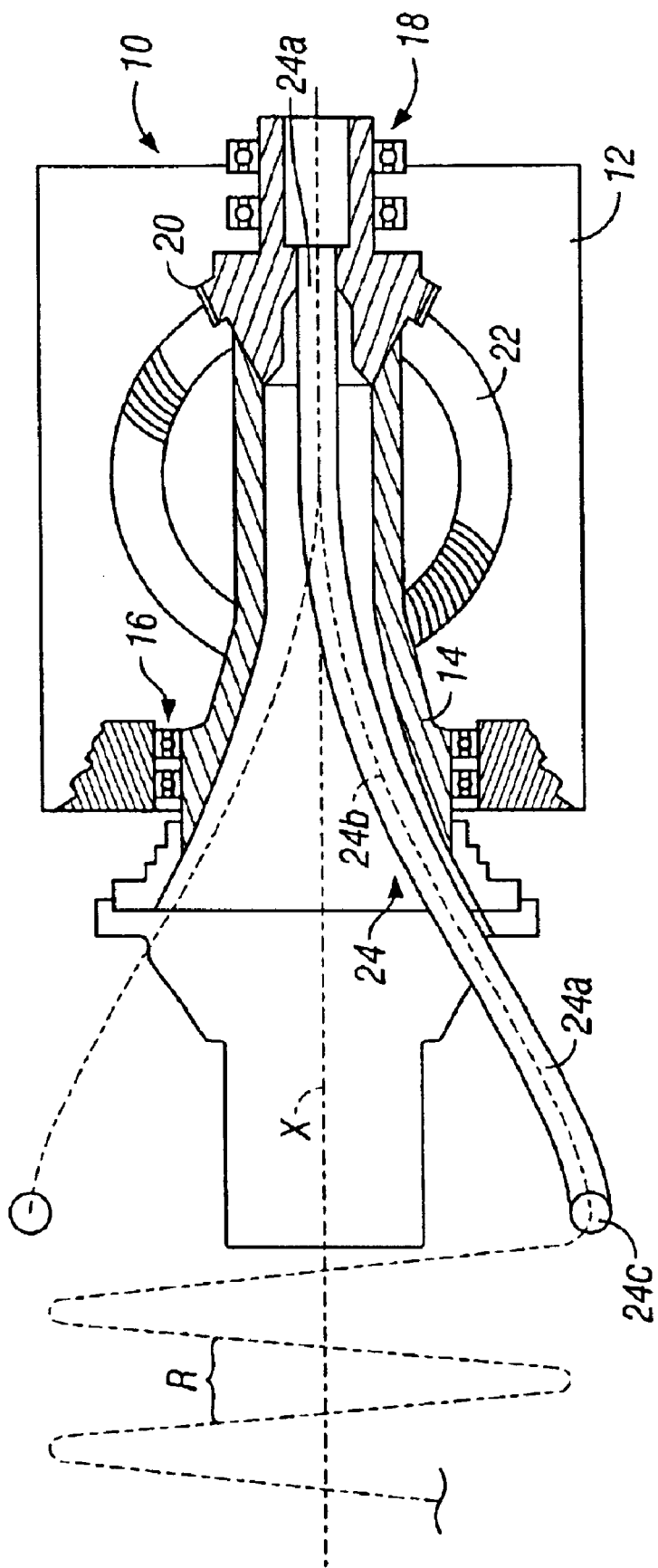
FIG. 1 is a schematic representation of a typical high speed rod laying head.
Figure 2:
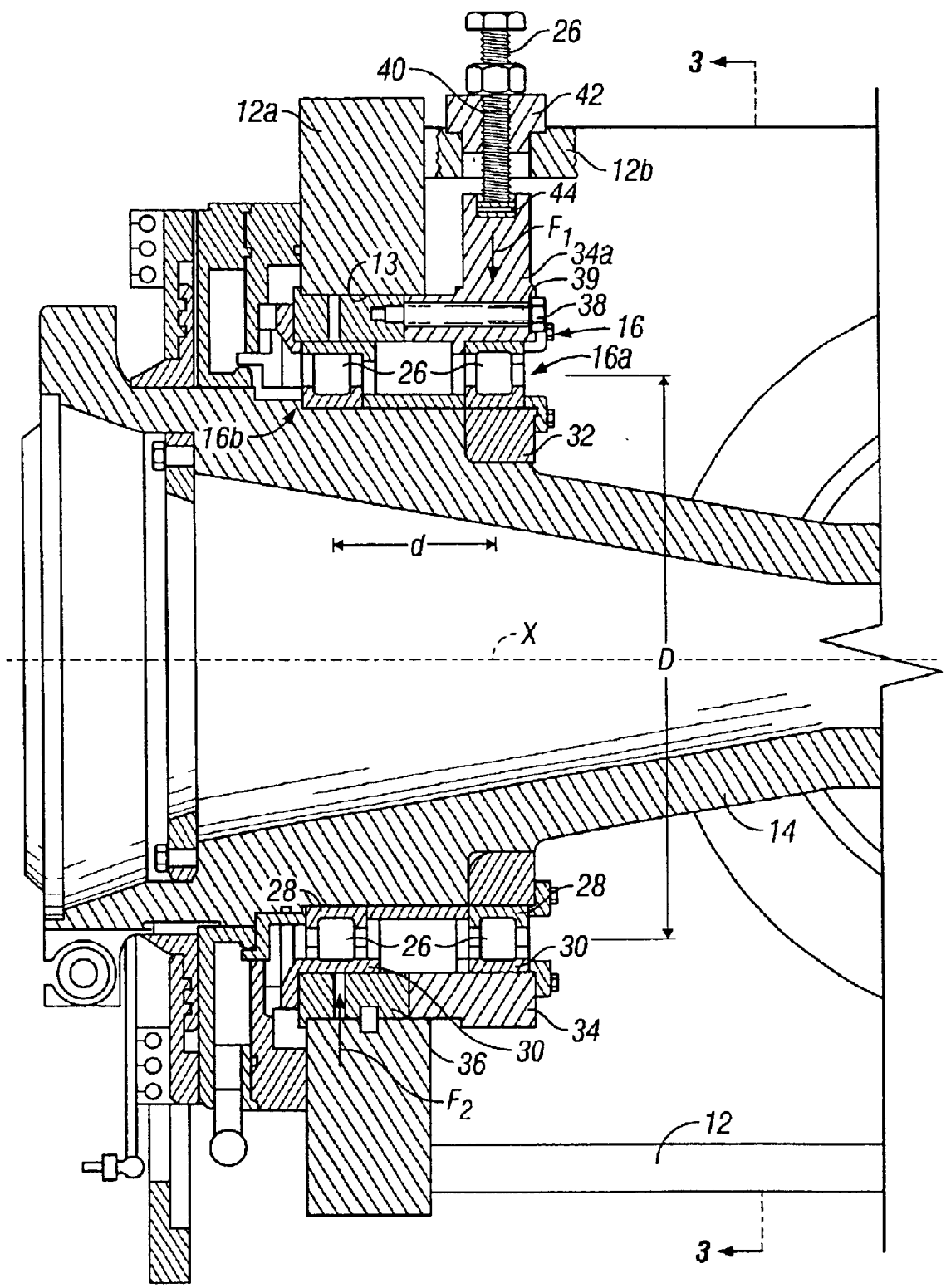
FIG. 2 is an enlarged longitudinal sectional view of the front portion of a laying head with the laying pipe removed, and incorporating a preloaded front bearing assembly in accordance with one embodiment of the present invention.
Figure 3:
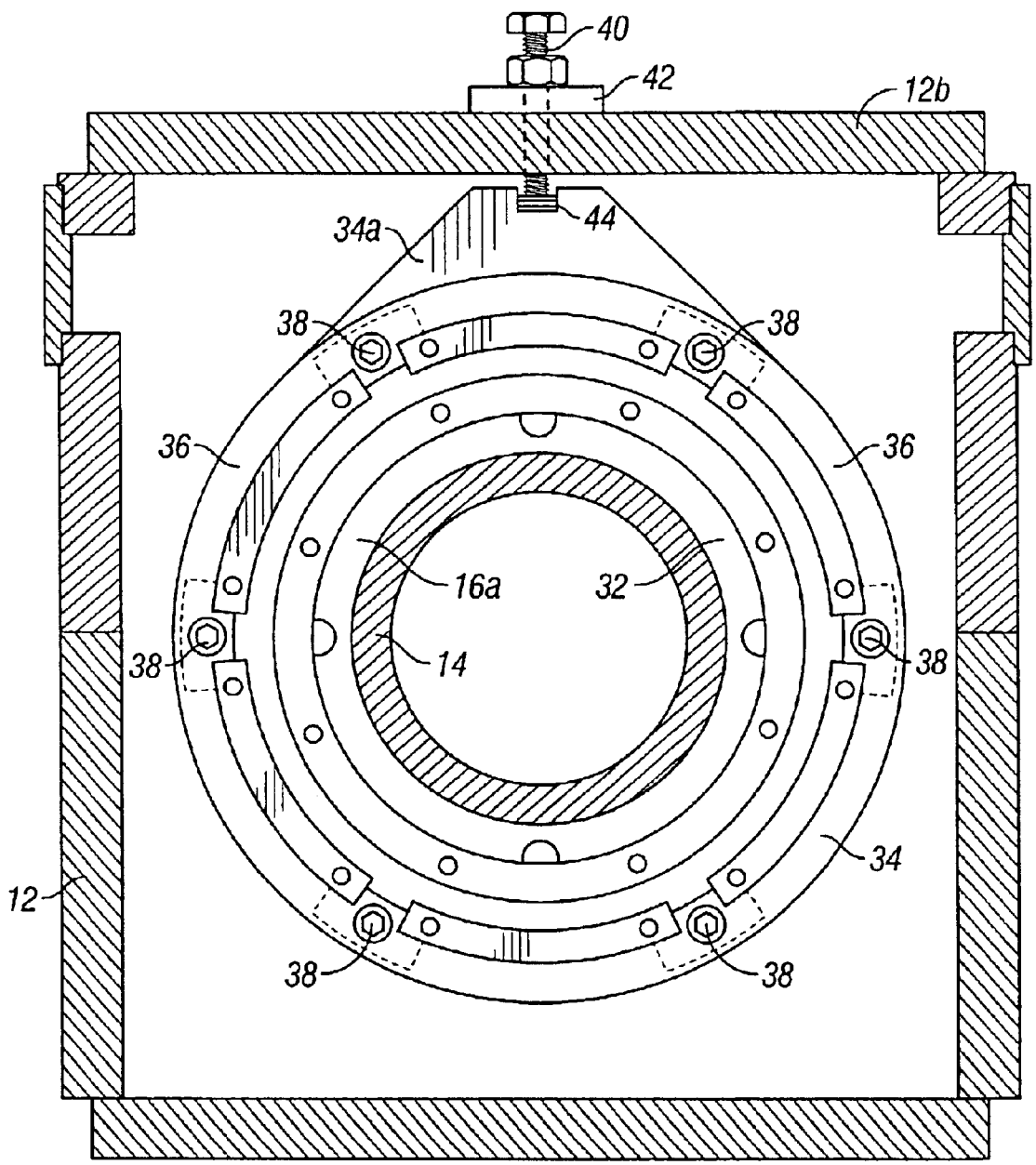
FIG. 3 is a sectional view taken along line 3—3 of FIG. 2.

With reference to FIGS. 2 and 3, it will be seen that the housing 12 includes a front plate 12a and a top plate 12b. The front bearing assembly 16 of the present invention includes inboard and outboard roller bearing sets 16a, 16b axially separated by a center to center distance "d". Preferably, the distance d is between about 5 to 40% of the nominal diameter "D" of the bearing sets 16a, 16b.

Each bearing set 16a, 16b includes roller elements 26 captured between circular inner and outer races 28, 30. The inner race 28 of bearing set 16b is seated on and fixed relative to the quill 14. The inner race 28 of bearing set 16a is seated on and fixed relative to an inner ring 32, which in turn is shrunk onto the quill.

The outer races 30 of the bearing sets 16a, 16b are contained respectively, in cartridges 34, 36. The cartridges 34, 36 are received in axial alignment in a bore 13 in the front housing plate 12a. Cartridge 34 is held against cartridge 36 by shoulder bolts 38 acting through resilient so called "bellville" washers 39. A slight clearance is provided between the shanks of the bolts 38 and the holes in cartridge 34 through which they extend as well as between the cartridge 34 and the bore 13. These clearances are sufficient to accommodate slight vertical movement of cartridge 34 relative to cartridge 36.

Cartridge 34 includes an integral lobe 34a underlying a top plate 12b of the housing. Lobe 34a is engaged by an adjustable bolt 40 threaded through a bushing 42 on the top plate 12b.

By appropriately adjusting the bolt 40, a downward preloading force $F_1$ is exerted on cartridge 34, and hence on bearing set 16a at a first location along its circumference. The interposition of a resilient bellville washer 44 between the bolt 40 and lobe 34a insures that the preloading force is resiliently applied. The preloading force may also be applied by equivalent alternative means, e.g., pressure cylinders, plastic or gas springs, etc.

The preloading force $F_1$ on bearing set 16a is opposed by a reactionary force $F_2$ exerted by the front housing plate 12a and acting on bearing set 16b at a second location disposed 180° from the point of application of the preloading force. The preloading and reactionary forces $F_1$, $F_2$ act in concert to eliminate clearances respectively in the upper half of bearing set 16a and the lower half of bearing set 16b. This in turn prevents or at least beneficially reduces both roller skidding and vibration attributable to normal operating clearances between the bearing components.

Figure 4:
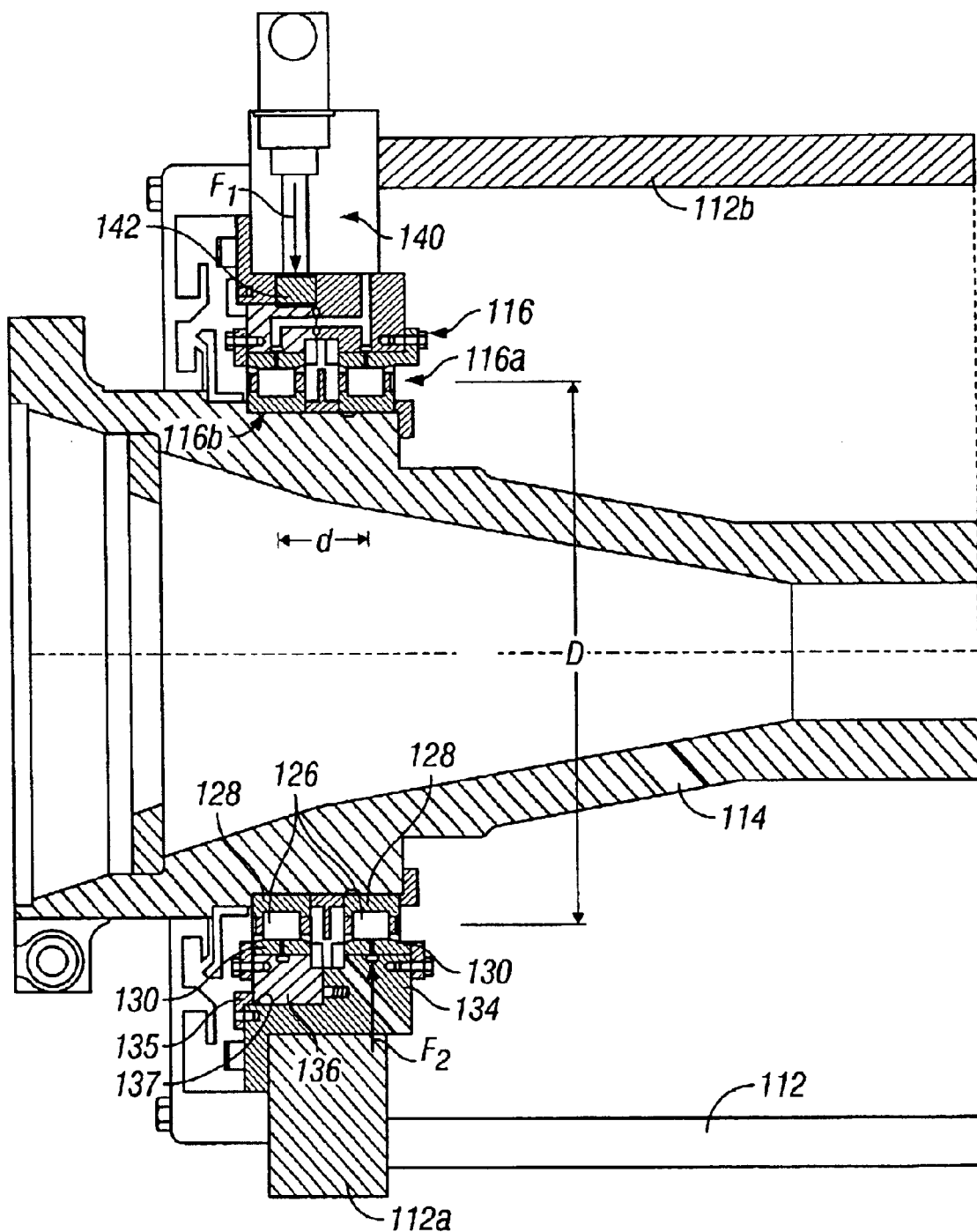
FIG. 4 is a view similar to FIG. 2 of another laying head incorporating a preloaded front bearing assembly in accordance with a second embodiment of the invention.

FIG. 4 discloses a second embodiment of the invention wherein the front bearing assembly 116 again includes inboard and outboard roller bearing sets 116a, 116b, each including roller elements 126 captured between inner and outer races 128, 130. The inner races 128 of both bearing sets are seated on and fixed relative to the quill 114. The outer race 130 of the inboard set 116a is contained within a cartridge 134 fixed in a bore of the front housing plate 112a. The outer race 130 of the outboard set 116b is contained within a cartridge 136, which in turn is held by a retaining 135 in a stepped bore 137 of cartridge 134.

A slight clearance between cartridge 136 and the bore 137 in cartridge 134, coupled with a modest retaining force exerted by a retainer ring 135, serve in concert to accommodate some slight vertical movement of cartridge 136 relative to cartridge 134.

A piston-cylinder unit 140 acts at a first location via an intermediate arcuate foot 142 to apply a preloading force $F_1$ to cartridge 136 and hence to the outer race 130 of the outboard set 116b. This preloading force is again opposed by a reactionary force $F_2$ exerted against the outer race 130 of the inboard set 116a at a location disposed 180° from the point of application of the preloading force. As with the first embodiment, the preloading force may alternatively be exerted by other equivalent means, e.g., that shown in FIGS. 2 and 3.

It thus will be seen that in a broad sense, the present invention operates to preload one bearing set by applying a force to its outer race at one location, with the other bearing set being preloaded by a reactionary force acting on its outer race at a location disposed 180° from the point of application of the preloading force. The preloading force may be applied either to the outer race of the inboard set, as shown in FIGS. 2 and 3, or to the outer race of the outboard set, as shown in FIG. 4.

From the foregoing detailed description, it has been shown how the objectives and advantages of the invention may be obtained by several preferred embodiments. However, modifications and equivalents of the disclosed concepts such as readily occur to those skilled in the art are intended to be included within the scope of this invention.

We claim:

1. A rolling mill laying head comprising:
   a housing;
   a quill;
   axially spaced front and rear bearing assemblies interposed between said quill and said housing for rotatably supporting said quill, said front bearing assembly comprising first and second axially spaced roller bearing sets contained, respectively, in first and second cartridges;
   means for retaining said cartridges in an integral axially aligned abutting relationship; and
   force exerting means for applying a radial preloading force to said first bearing set at a first location around the circumference thereof, said preloading force being opposed by a reactionary force acting on said second bearing set at a second location around the circumference thereof disposed 180° from said first location.

2. The rolling mill laying head of claim 1 wherein said first and second bearing sets each comprise roller elements captured between circular inner and outer races, said inner races being fixed with respect to said quill and said outer races being fixed with respect to said housing.

3. The rolling mill laying head of claim 2 wherein said force exerting means is supported by said housing and is arranged to act on the outer race of said first bearing set, and wherein said reactionary force is exerted by said housing acting on the outer race of said second bearing set.

4. The rolling mill laying head of claim 1 wherein said second cartridge is received and rotatably fixed in a bore in a front plate of said housing, and wherein said first cartridge projects axially from said second cartridge and inwardly into said housing.

5. The rolling mill laying head of claim 4 wherein said force exerting means is constructed and arranged to engage said first cartridge.

6. The rolling mill laying head of claim 1 wherein the center to center distance between said first and second bearing sets is between about 5 to 40% of the nominal diameter of said bearing sets.

7. The rolling mill laying head of claim 1 wherein said preloading force is resiliently applied.

8. A method of reducing clearances between the components of a bearing assembly rotatably supporting a quill in the housing of a rolling mill laying head, said method comprising:
   subdividing the bearing assembly into axially spaced roller bearing sets;
   containing said roller bearing sets in cartridges retained in an axially aligned abutting relationship; and
   applying a preloading force to one of said cartridges at a first location around the circumference of its respective bearing set, and opposing said preloading force with a reactionary force applied to the other of said cartridges at a second location disposed 180° from said first location.

* * * * *